(12) United States Patent
Karhuketo et al.

(10) Patent No.: US 6,322,899 B1
(45) Date of Patent: Nov. 27, 2001

(54) PLASTIC LAMINATE

(75) Inventors: Hannu Karhuketo; Heikki Korpela, both of Valkeakoski (FI)

(73) Assignee: UPM-Kymmene Oyj, Valkeakoski (FI)

( * ) Notice: Subject to any disclaimer, the term of this patent is extended or adjusted under 35 U.S.C. 154(b) by 0 days.

(21) Appl. No.: 09/242,586
(22) PCT Filed: Jun. 9, 1998
(86) PCT No.: PCT/FI98/00489
§ 371 Date: May 6, 1999
§ 102(e) Date: May 6, 1999
(87) PCT Pub. No.: WO99/01278
PCT Pub. Date: Jan. 14, 1999

(30) Foreign Application Priority Data

Jun. 19, 1997 (FI) .................................................... 972638

(51) Int. Cl.⁷ ............................ B32B 27/08; B32B 27/10; B32B 27/34; B32B 27/36
(52) U.S. Cl. ............................ 428/475.2; 428/479.3; 428/479.6; 428/480; 428/481; 428/532; 428/533; 428/537.5
(58) Field of Search .................................. 428/34.2, 34.3, 428/35.7, 480, 481, 532, 533, 474.7, 475.2, 479.3, 479.6, 537.5

(56) References Cited

U.S. PATENT DOCUMENTS

| | | | | |
|---|---|---|---|---|
| 5,360,845 | * | 11/1994 | Billmers et al. | 524/51 |
| 5,391,423 | * | 2/1995 | Wnuk et al. | 428/217 |
| 5,512,378 | * | 4/1996 | Bastioli et al. | 428/484 |
| 5,679,421 | * | 10/1997 | Brinton, Jr. et al. | 428/484 |
| 5,756,194 | * | 5/1998 | Shogren et al. | 428/312.4 |
| 6,033,747 | * | 3/2000 | Shiotani | 428/34.3 |

* cited by examiner

Primary Examiner—Vivian Chen
(74) Attorney, Agent, or Firm—Fitch, Even, Tabin & Flannery

(57) ABSTRACT

A plastic laminate with two or more plastic layers, at least one of which is polyhydroxyalkanoate, such as hydroxybutyrate/hydroxyvalerate copolymer. Next to the polyhydroxyalkanoate layer and attached to it is a layer of biodegradable polyester amide.

7 Claims, 1 Drawing Sheet

PLASTIC LAMINATE

Plastic laminates are manufactured particularly for the needs of the packaging industry. Food stuff packaging containers in particular require laminates with two or more plastic layers, one of which can have good barrier properties against substance migration while another layer is acting as a layer preventing adherence of different layers to each other, and the third has suitable surface properties for heatsealing or is compatible to the food stuff to be in contact with it, etc. Furthermore, the superimposed plastic layers can be placed on top of a cellulose-based basic layer providing the required strength to the material, and this layer can be paper or board, for example paper with suitable outer surface properties for printing, greaseproof paper or liquid packaging board, folding boxboard or sack paper.

With the growing refuse problems, the biodegradability of packaging materials has become an important issue. The problem with biodegradable plastics is, however, that as such they are often unsuitable for use as packaging materials, which are required strength and specific properties. Various multilayer structures have been developed mainly based on polyhydroxyalkanoates. For example, the European application publication 603876 (Buck Werke GmbH & Co) presents a biodegradable packaging material with a core layer of polyvinyl alcohol acting as an oxygen barrier, and on both sides of the core layer polyhydroxybutyrate and/or polyhydroxyvalerate or their copolymer (HB/HV) acting as a water vapour barrier. This three-layer structure is further coated on both sides with a layer of cellulose derivative or paper, for example with a cellulose derivative on the side in contact with aqueous food stuff, and with paper on the outmost outer surface. The purpose of the layers of polyhydroxyalkanoates (polyhydroxybutyrate, polyhydroxyvalerate or HB/HV copolymer) on both sides of the layer of polyvinyl alcohol with poor water resistance is to protect this oxygen barrier layer from the damaging effect of water. Similar compositions are presented in other publications as well.

Laminate structures containing compatible plastics and being biodegradable are few, and their industrial manufacture is often impaired by the poor strength and difficult processability of biodegradable plastics.

The purpose of the present invention is to add the number of alternatives available.

It has now been observed that a biodegradable polyester amide or a starch derivative is well compatible with one or several layers of polyhydroxyalkanoate. In a plastic laminate the polyester amide can act, for example, as a layer connecting the various polyhydroxyalkanoate layers, or as a heatsealable surface layer. A starch derivative which possesses the properties of a thermoplastic can act in the same respect, and can futhermore be used as an adhesive plastic between a fibrous basic layer and other plastic layers.

In the used compositions, the polyhydroxyalkanoate provides good barrier properties and the polyester amide or the starch derivative can be used as a supporting plastic, and they have good runability in coextrusion.

The compositions in question can be used as such or preferably on top of a biodegradable cellulose-based basic layer. This layer can be paper, greaseproof paper or board. It is also possible that the laminate has several cellulose-based layers, for example a board and a paper layer.

Biodegradable polyester amide refers to a polyester amide of thermoplastic type which in its properties resembles polyolefins and which can be worked in a molten condition, for example mould it into thin films using methods of plastic technology. This is a so called statistically constructed polyester amide with sequential ester and amide segments. A typical example is, for example, a polyester amide in which the ester segments consist of chains formed by adipic acid and butane diol, while the amide segments consist of polyamide chains formed by aminocapronic acid. The chains are connected to each other with ester and amide bonds. The proportion in weight of the ester chains can be 30–70 w-% and the corresponding proportion in weight of the amide chains 70–30 w-%. The melting point of the material is above 100° C., and the material is therefore suitable for melt working in temperatures between 100° C.–200° C. This polyester amide which can be worked like polyolefins is described, among others, in the European application publication 641817 (Bayer AG).

Biodegradable starch derivatives have similar melt working properties. As an example, the extrusion coating sorts sold under the trade name "COHPOL" by Primalco Oy can be mentioned. Biodegradable starch derivatives are produced by esterifying the glucose units of the polymer chain of starch, and such starch esters and their use is described, among others, in the international publication WO94/22919, the European application publication 638609 and the U.S. Pat. No. 5,498,706.

BRIEF DESCRIPTION OF DRAWINGS

In the following the invention is described in more detail with reference to the attached drawing where.

Plastic laminate structure in the present context refers to all structures which have superimposing layers or films of different plastics directly connected to each other. The laminates can have been manufactured using any method of plastic technology, but preferably they coextruded, with the thickness of a single layer being generally less than 100 μm, often as little as 2–60 μm. In coextrusion, the different materials come from nozzles in molten condition side by side as wide films and are lead one on top of the other on top of a basic layer, such as paper or board.

Figure 1:
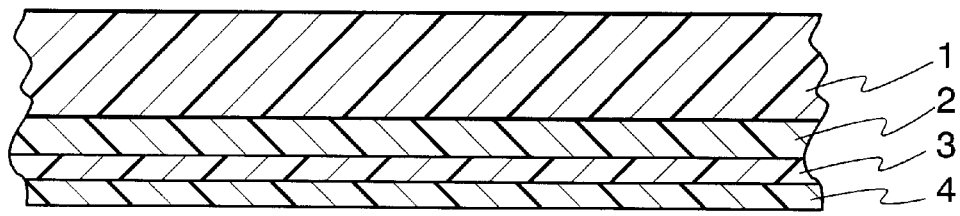
FIG. 1 shows one laminate structure according to the invention.

FIG. 1 shows a plastic laminate with a biodegradable cellulose-based basic layer (1) which provides the product its strength and the basis weight of which can vary within the limits known for paper and board. On top of the basic layer (1) the following layers are laminated, which are, counted from the basic layer (1): a polyhydroxyalkanoate layer (2) (for example polyhydroxybutyrate, PHB, or hydroxybutyrate/hydroxyvalerate copolymer HB/HV), a polyester amide layer (3) and finally a polyhydroxyalkanoate layer (4) forming the outer layer. The product presented in FIG. 1 can form the material for flexible packaging containers used in the packaging of food stuffs, and the polyhydroxyalkanoate layer (4) is then in contact with the food stuff. Board-based materials can also be used when suitably moulded as various packaging vessels, cans or drinking cups in food appliances.

The outermost polyhydroxyalkanoate layer (4) can also be omitted leaving the polyester amide layer (3) as the outermost layer. A material of this type can be used, for example, as raw material for refuse bags.

Figure 2:
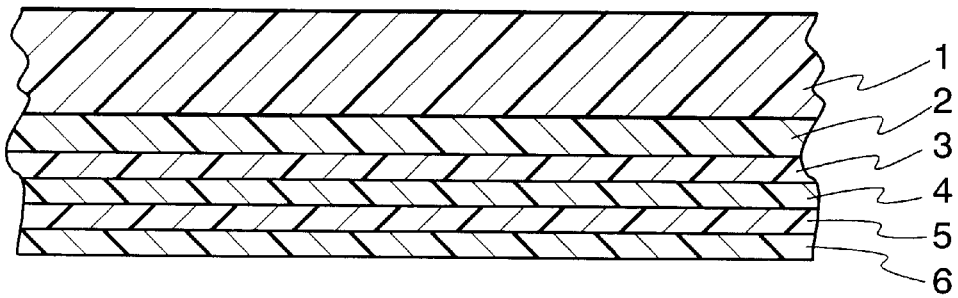
FIG. 2 shows another laminate structure according to the invention.

FIG. 2 shows another embodiment where the layers 1–4 are as above. On top of the polyhydroxyalkanoate layer (4)

there is a further polyester amide layer (5) and an outermost polyhydroxyalkanoate layer (6). The possibilities for application for food stuff packaging are identical to those mentioned in connection to FIG. 1. The presence of two extra layers improves particularly the barrier properties. The three polyhydroxyalkanoate layers are connected to each other through the two polyester amide layers, and the microscopic holes that may exist in the polyhydroxyalkanoate layers, which could impair the barrier properties, do not fall in the same location. The layer (2) of polyhydroxyalknoate also acts as an adhesive layer between the fibrous basic layer (1) and the outermost plastic layers.

When a polyhydroxyalkanoate, particularly HB/HV copolymer is the layer forming the outer surface (layer 4 or layer 6), the laminate material is well suitable also to liquid packaging containers because of the good water resistance of the outer layer.

Figure 3:
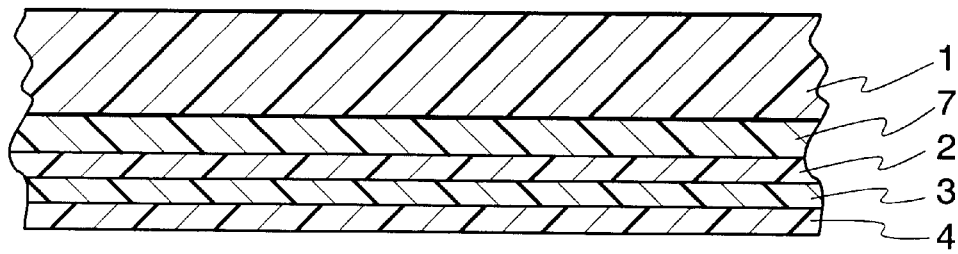
FIG. 3 shows a third laminate structure according to the invention.

Biodegradable starch derivative can be used in the same positions as the polyester amide, i.e., in FIGS. 1 and 2 it could be the substance of the layers marked with reference numbers 3 and 5. FIG. 3 shows a preferred method of using a starch derivative in the same laminate with polyhydroxyalkanoate. Then the starch derivative is placed between the fibrous basic layer (1) and the other plastic layers, and thus acts as an adhesive layer (7) attaching the polyhydroxyalkanoate layer (2) to the basic layer. Between the polyhydroxyalkanoate layers (2) and (4) there is also a layer (3) of starch derivative.

Other polyhydroxyalkanoates can also be used as polyhydroxyalkanoates instead of PHB or HB/HV, for example hydroxybutyrate/hydroxyhexanoate copolymers, described in the international publication WO95/20621.

The basic layer (1) can also be greaseproof paper described, among others, in the applicant's earlier international patent application PCT/FI96/00184. Greaseproof paper has good grease and aroma tightness, and the layers of biodegradable plastic on top of it noticeably increase its oxygen tightness. The level of tightness (grease tightness) of greaseproof paper expressed in the so-called Linden tightness can be 30–600 s, preferably 100–600 s.

In the following, the processing properties of polyester amide as observed in experiments are reported.

In extrusion coating, polyester amide sold by Bayer AG under the trade name BAK1095 was laminated on top of paper with a coarse surface and weighing 70 g/m$^2$. Coatings weighing over 2 g/m$^2$ were stable with speeds 40–200 m/min. The temperature at the area of the extrusion nozzle was 190° C. The coating showed good mechanical properties in other respects as well. Furthermore, the coating was observed to have good heatsealing properties with basis weights of 2–4 g/m$^2$ at a temperature of 160–170° C. A coating weighing 8.3 g/m$^2$ was heatsealable to another corresponding coating at a temperature of 140° C. Therefore, when using polyester amide as the outermost layer in a laminate a heatsealable surface is provided which can be utilized in the manufacture of various bags.

Polyester amide can be characterized using the following properties important in extrusion and packaging application: general good runability, good draw-down, reasonable neck-in (tension stiffening), good bending resistance, pinhole resistance and grease resistance, and adequate adhesion to polyhydroxyalkanoates.

Starch derivative, on the other hand, can be characterized with the following properties: general good runability, good draw-down, relatively small neck-in (tension stiffening), good adhesion to cellulose-based basic layers such as paper, and adequate adhesion to polyhydroxyalkanoates. Furthermore, starch derivatives are easy to melt work in temperatures between 100–200° C.

The term plastic as used above should be understood as referring not only to the basic polymer but also such materials in which the basic polymer is mixed with additives improving its properties, particularly plasticizers, already known in connection to biodegradable plastics.

What is claimed is:

1. A plastic laminate comprising at least two or more plastic layers wherein at least one of the plastic layers is polyhydroxyalkanoate, the polyhydroxyalkanoate layer contacting a layer of biodegradable polyester amide.

2. A plastic laminate according to claim 1, wherein the plastic laminate includes two polyhydroxyalkanoate layers between which there is a layer of biodegradable polyester amide.

3. A plastic laminate according to claim 1, wherein the plastic layers adjacently contact a naturally degrading cellulose-based layer.

4. A plastic laminate according to claim 3, further comprising a layer of biodegradable starch derivative effective for forming an adhesive layer between the naturally degrading cellulose-based layer and the polyhydroxyalkanoate layer.

5. A plastic laminate according to claim 1, wherein the polyhydroxyalkanoate layer forms an outer surface of the plastic laminate.

6. A plastic laminate according to claim 1, wherein the plastic layers are laminated adjacent to each other by coextrusion of molten plastic material.

7. A plastic laminate according to claim 1, wherein the polyhydroxyalkanoate is a hydroxybutyrate/hydroxyvalerate copolymer.

* * * * *